(12) United States Patent
Yabuuchi et al.

(10) Patent No.: US 10,129,424 B2
(45) Date of Patent: Nov. 13, 2018

(54) IMAGE READING DEVICE, IMAGE FORMING APPARATUS, METHOD OF DISPLAYING DOCUMENT IMAGE, AND NON-TRANSITORY RECORDING MEDIUM

(71) Applicants: Masayuki Yabuuchi, Kanagawa (JP); Naoki Asaba, Kanagawa (JP); Hideki Hashimoto, Tokyo (JP); Hiroshi Ishii, Tokyo (JP); Ayumu Hashimoto, Kanagawa (JP); Atsushi Yoshida, Kanagawa (JP); Osamu Kizaki, Saitama (JP); Naoki Goh, Tokyo (JP); Masafumi Kishi, Kanagawa (JP); Masaki Nagase, Kanagawa (JP)

(72) Inventors: Masayuki Yabuuchi, Kanagawa (JP); Naoki Asaba, Kanagawa (JP); Hideki Hashimoto, Tokyo (JP); Hiroshi Ishii, Tokyo (JP); Ayumu Hashimoto, Kanagawa (JP); Atsushi Yoshida, Kanagawa (JP); Osamu Kizaki, Saitama (JP); Naoki Goh, Tokyo (JP); Masafumi Kishi, Kanagawa (JP); Masaki Nagase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/417,253

(22) Filed: Jan. 27, 2017

(65) Prior Publication Data

US 2017/0244853 A1 Aug. 24, 2017

(30) Foreign Application Priority Data

Feb. 22, 2016 (JP) ................... 2016-031316

(51) Int. Cl.
*H04N 1/04* (2006.01)
*H04N 1/00* (2006.01)

(52) U.S. Cl.
CPC ....... *H04N 1/00827* (2013.01); *H04N 1/0044* (2013.01); *H04N 1/00251* (2013.01);
(Continued)

(58) Field of Classification Search
None
See application file for complete search history.

(56) References Cited

U.S. PATENT DOCUMENTS 4,633,080 A * 12/1986 Wilman .................. H04N 1/10
250/234
4,980,720 A * 12/1990 Siegel .................... G03G 15/04
355/25

(Continued)

FOREIGN PATENT DOCUMENTS

JP 8-279884 10/1996
JP 2006-067330 3/2006

*Primary Examiner* — Madelein T Nguyen
(74) *Attorney, Agent, or Firm* — Harness, Dickey & Pierce, P.L.C.

(57) ABSTRACT

An image reading device includes an imaging device to capture an image of a document placed below the imaging device to generate a document image and output an image signal based on the document image, circuitry to determine a size of a fed-sheet based on information on the fed-sheet, the fed-sheet being a sheet to be formed with the document image, generate a frame image for the document image, the frame image having a size equal to the size of the fed-sheet, and synthesize the frame image with the image signal output from the imaging device to generate a synthesized image, and a display to display the synthesized image.

9 Claims, 14 Drawing Sheets

(52) U.S. Cl.
CPC ..... *H04N 1/00702* (2013.01); *H04N 1/00708* (2013.01); *H04N 1/00721* (2013.01); *H04N 1/00771* (2013.01)

(56) References Cited

U.S. PATENT DOCUMENTS

| | | | | |
|---|---|---|---|---|
| 5,325,213 | A * | 6/1994 | Takahashi | H04N 1/1017 271/193 |
| 5,359,207 | A * | 10/1994 | Turner | H01L 27/14643 250/208.1 |
| 5,475,505 | A * | 12/1995 | Minasian | H04N 1/10 355/25 |
| 5,610,720 | A * | 3/1997 | Fujioka | H04N 1/1017 355/25 |
| 5,689,348 | A * | 11/1997 | Takahashi | G03G 15/043 355/25 |
| 5,760,925 | A * | 6/1998 | Saund | G06T 3/0031 355/25 |
| 5,764,379 | A * | 6/1998 | Matsuda | H04N 1/1013 355/23 |
| 5,764,383 | A * | 6/1998 | Saund | H04N 1/113 355/25 |
| 5,778,276 | A | 7/1998 | Hasegawa | |
| 5,805,272 | A * | 9/1998 | Nozawa | H04N 1/00681 355/25 |
| 5,969,795 | A * | 10/1999 | Honda | H04N 1/387 355/25 |
| 5,995,245 | A * | 11/1999 | Moro | H04N 1/02409 358/474 |
| 6,041,146 | A * | 3/2000 | Kamon | H04N 1/401 355/25 |
| 6,055,036 | A * | 4/2000 | Takahashi | H04N 1/00795 116/234 |
| 6,057,936 | A * | 5/2000 | Obara | G03G 15/6552 358/296 |
| 6,101,283 | A * | 8/2000 | Knox | H04N 1/4095 358/463 |
| 6,486,895 | B1 * | 11/2002 | Robertson | G06F 17/30873 707/E17.111 |
| 8,270,041 | B2 * | 9/2012 | Fujiwara | H04N 1/2038 358/1.12 |
| 9,030,718 | B1 * | 5/2015 | Lu | H04N 1/04 358/474 |
| 2002/0191994 | A1 * | 12/2002 | Lee | H04N 1/1017 399/362 |
| 2003/0043095 | A1 * | 3/2003 | Silverbrook | G06Q 50/00 345/87 |
| 2004/0021915 | A1 * | 2/2004 | Lee | H04N 1/10 358/488 |
| 2004/0169894 | A1 * | 9/2004 | Schroath | H04N 1/1013 358/474 |
| 2004/0201870 | A1 * | 10/2004 | Araki | H04N 1/387 358/3.26 |
| 2004/0218231 | A1 * | 11/2004 | Sheng | H04N 1/02815 358/474 |
| 2005/0073733 | A1 * | 4/2005 | Kim | H04N 1/00384 358/528 |
| 2005/0243386 | A1 * | 11/2005 | Sheng | H04N 1/0313 358/506 |
| 2006/0152773 | A1 * | 7/2006 | Wu | H04N 1/10 358/474 |
| 2007/0292026 | A1 * | 12/2007 | Reznik | G06K 9/036 382/176 |
| 2008/0024845 | A1 * | 1/2008 | Makino | H04N 1/387 358/538 |
| 2009/0021800 | A1 * | 1/2009 | Suto | H04N 1/00129 358/474 |
| 2010/0046047 | A1 * | 2/2010 | Makino | H04N 1/00681 358/475 |
| 2010/0079821 | A1 * | 4/2010 | Hirano | H04N 1/00795 358/448 |
| 2010/0103472 | A1 * | 4/2010 | Kim | G06Q 10/107 358/402 |
| 2010/0157381 | A1 * | 6/2010 | Chen | H04N 1/00689 358/449 |
| 2011/0019247 | A1 * | 1/2011 | Raynor | H04N 1/047 358/482 |
| 2011/0267661 | A1 * | 11/2011 | Hayes | H04N 1/00543 358/474 |
| 2013/0077138 | A1 * | 3/2013 | Shen | H04N 1/19594 358/498 |
| 2013/0314753 | A1 * | 11/2013 | Brewer, III | H04N 1/3877 358/448 |
| 2014/0009797 | A1 * | 1/2014 | Watanabe | H04N 1/04 358/408 |
| 2014/0139421 | A1 * | 5/2014 | Boulanger | G06F 3/0487 345/156 |
| 2016/0219163 | A1 | 7/2016 | Shirado et al. | |
| 2017/0277343 | A1 * | 9/2017 | Hotta | G06F 3/0416 |

* cited by examiner

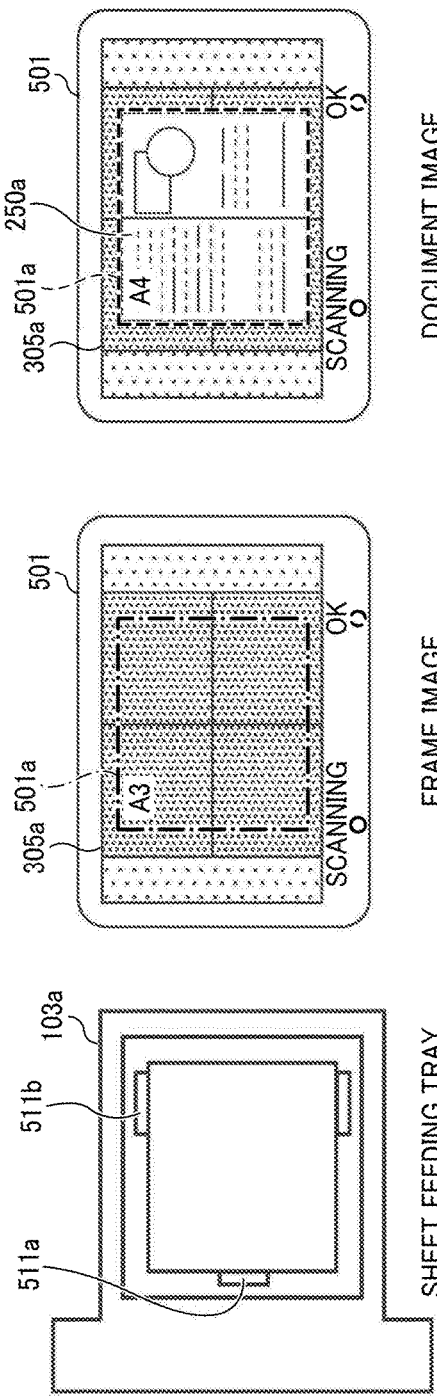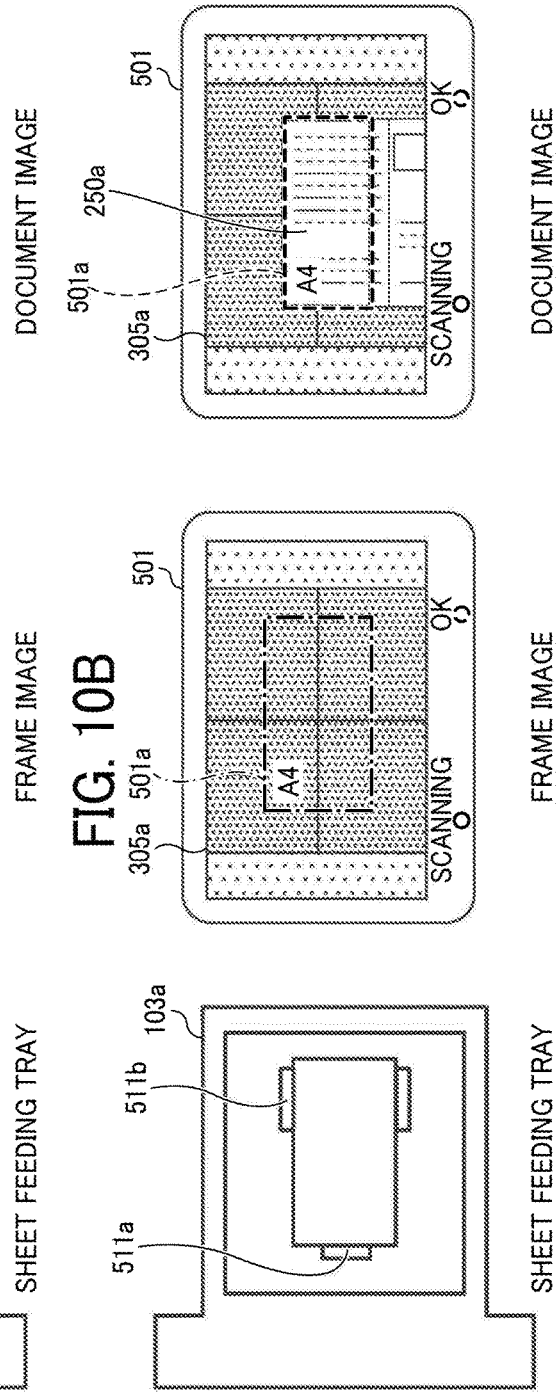

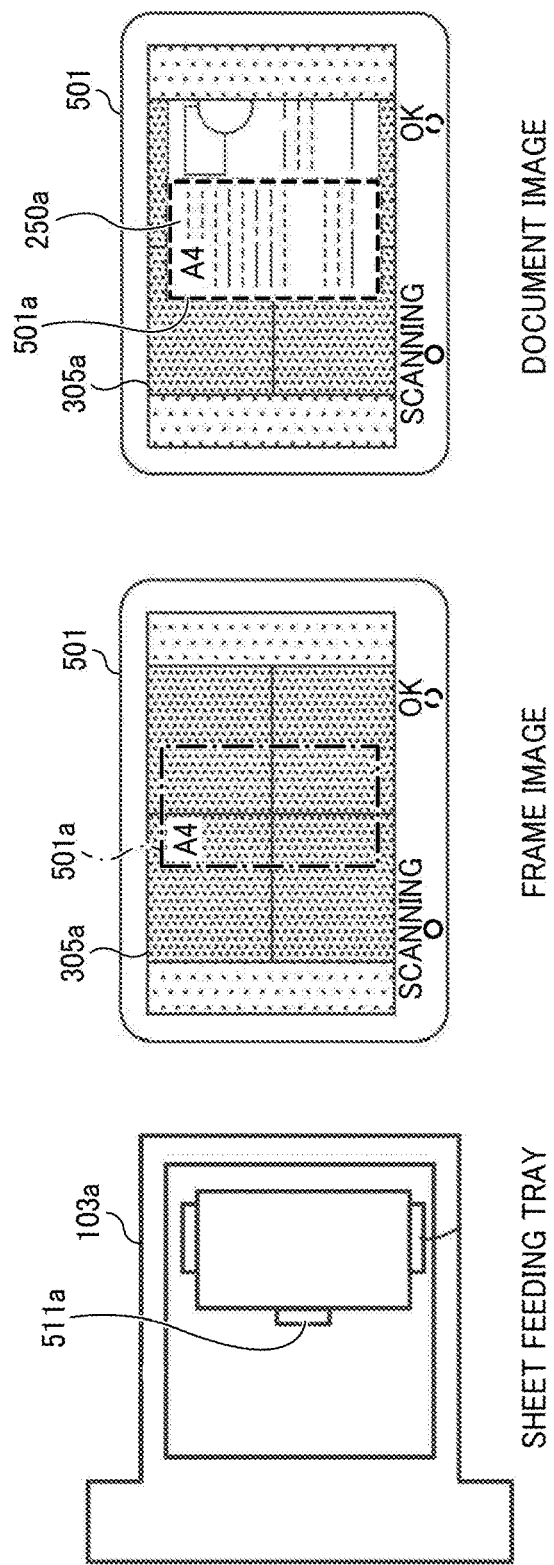

AREA DIVISION OF IMAGE DATA

NO DOCUMENT

DISPLACEMENT 1

DISPLACEMENT 2

OK 1

OK 2

OK 3

IMAGE READING DEVICE, IMAGE FORMING APPARATUS, METHOD OF DISPLAYING DOCUMENT IMAGE, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2016-031316, filed on Feb. 22, 2016, in the Japan Patent Office, the entire disclosure of which is hereby incorporated by reference herein.

BACKGROUND

Technical Field

Embodiments of the disclosure relates to an image reading device, an image forming apparatus, a method of displaying a document image, and non-transitory recording medium.

Description of the Related Art

Various types of image reading devices, which read an image of a document and perform processing on the image, have been known.

One type of the image reading devices has a document table on which a document is placed with its surface up, illuminates the document from above the surface of the document to be read and captures an image of the document to read the image.

Such a type of the image reading devices is referred to as a top shot scanner.

SUMMARY

An image reading device includes an imaging device to capture an image of a document placed below the imaging device to generate a document image and output an image signal based on the document image, circuitry to determine a size of a fed-sheet based on information on the fed-sheet, the fed-sheet being a sheet to be formed with the document image, generate a frame image for the document image, the frame image having a size equal to the size of the fed-sheet, and synthesize the frame image with the image signal output from the imaging device to generate a synthesized image, and a display to display the synthesized image.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings;

FIGS. 10A, 10B, and 10C are diagrams each illustrating a relationship among a state of sheet set on a sheet-feeding tray, a state of frame image displayed on a screen, and a state of moving image displayed on the screen in FIG. 7;

DETAILED DESCRIPTION

Figure 1:
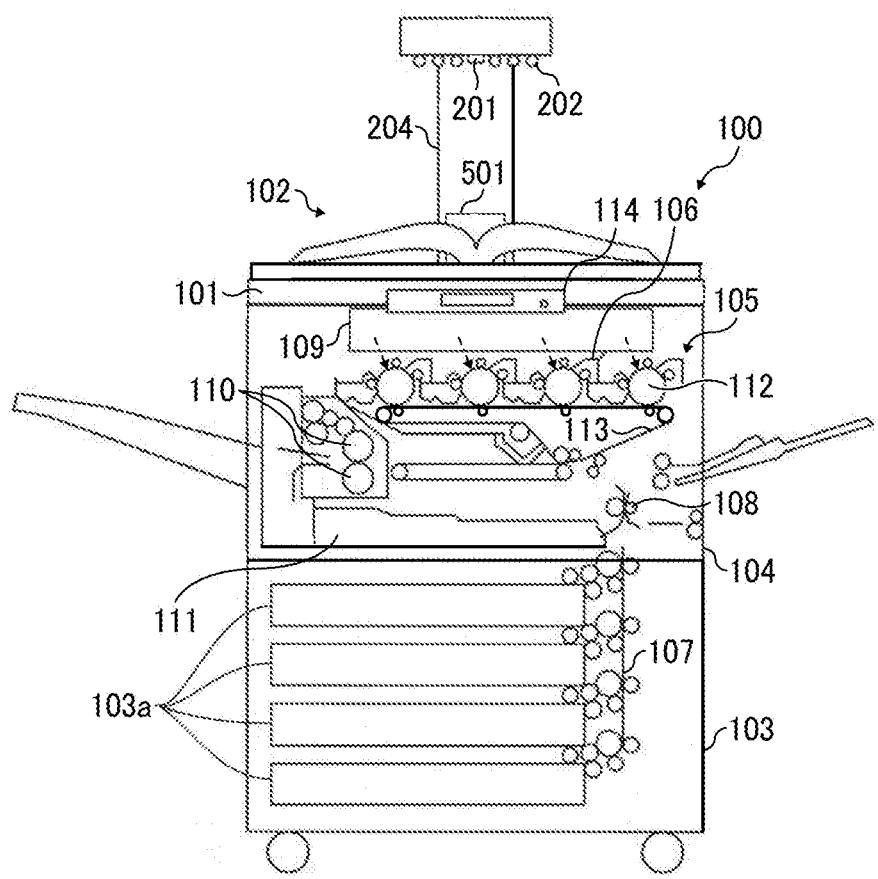
FIG. 1 is a schematic view illustrating an internal configuration of an image forming apparatus including an image reading device (document scanner) according to one embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing example embodiments illustrated in the drawings, specific terminology is employed for the sake of clarity. However, the present disclosure is not intended to be limited to the specific terminology so selected and it is to be understood that each specific element includes all technical equivalents that, have the same function, operate in a similar manner, and achieve the same result. Herein, in this disclosure, the terms "area sensor" and "imaging device" indicate the same thing.

According to one of the embodiment of the disclosure, an image reading device, which is, for example, referred to as a top shot scanner, is provided. The image reading device captures an image of a document, using a moving image capturing function having low resolution, generates display data (display information) in which an image area that is to be printed is added to image data that is captured using the moving image capturing function, and displays the display data with a display of the image reading device. A description is now given of exemplary embodiments with reference to the drawings.

FIG. 1 is a schematic view illustrating an internal configuration of an image forming apparatus 100 that includes an image reading device 102 according to one embodiment of the disclosure. The image forming apparatus 100 includes a scanner 101, the image reading device (hereinafter, referred to as a document scanner) 102, a sheet-feeding device 103 that has one or more sheet-feeding trays 103a, a main body 104, and a control panel 114.

The main body 104 of the image forming apparatus 100 includes a tandem type image forming device (image forming device) 105, a registration roller 108, an optical writing device 109, a fixing device 110 and a duplex tray 111. The registration roller 108 feeds a recording sheet from the sheet-feeding device 103 to the image forming device 105 via a conveying path 107. The recording sheet is conveyed to the image forming device 105 in a manner that an image formed on an intermediate transfer belt 113 is transferred to the recording sheet being conveyed. The image forming device 105 includes four photoreceptor drums 112 arranged side by side. The four photoreceptor drums 112 corresponds to four colors of cyan, magenta, yellow, and black (CMYK). Around each photoreceptor drum 112, image forming elements such as a charger, a developing device 106, a transferring device, a cleaner, and an electric charge removing device are disposed. Additionally, the intermediate transfer belt 113 stretches over a driving roller and a driven roller, such that the intermediate transfer belt 113 is sandwiched between the transferring devices and the photoreceptor drums 112 to form nips.

Such an image forming apparatus 100 that has a tandem type configuration as described above performs optical writing of an image. More specifically, the image forming apparatus 100 optically writes the image of each color of CMYK on a corresponding one of the photoreceptor drums 112 to form a latent image, develops the latent image of each color into a toner image with toner at each developing device 106, and performs primary transfer of the toner images in order of, for example, Y, M, C, and K to the intermediate transfer belt 113 to form a full color image on which the toner images are superimposed one above the other. The full color image is transferred on the recording sheet, which is conveyed from the sheet-feeding device 103 through the conveying path 107. The fixing device 110 then fixes the image on the recording sheet. A conveying device of the fixing device 110 conveys the recording sheet on which the image is fixed with the fixing device 110 to an output tray for sheet ejection. With the sequence of operations as described above, the full color image is formed on the recording sheet.

Figure 2A:
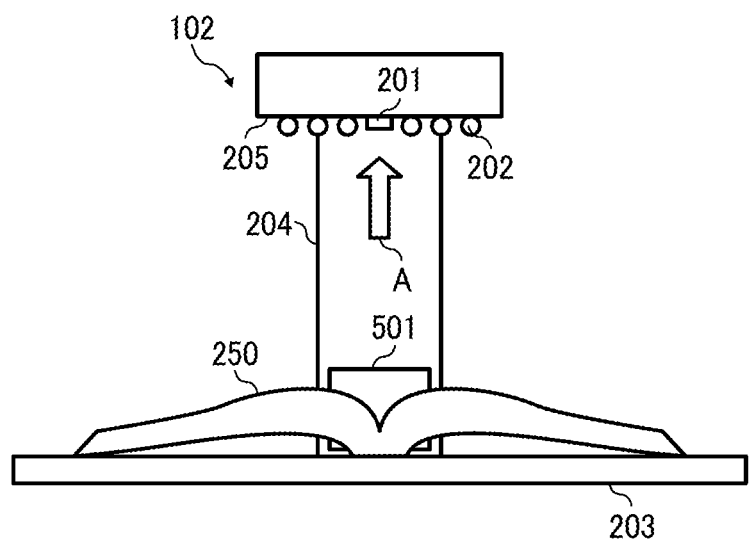
FIGS. 2A and 2B are views illustrating details of the document scanner of FIG. 1.
Figure 2B:
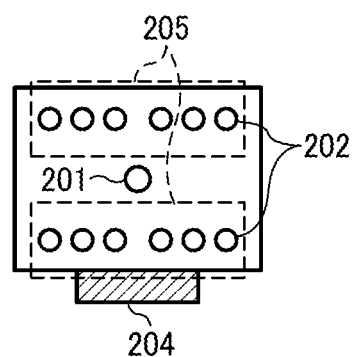

FIGS. 2A and 2B are views illustrating details of the document scanner 102 of FIG. 1. FIG. 2A is a front view of the document scanner 102. FIG. 2B is a view of the document scanner 102 of which an illumination device 205 is viewed in a direction indicated by an arrow A in FIG. 2A (from the lower surface side).

The document scanner 102 includes an area sensor (imaging device) 201, the illumination device 205 that illuminates a document, a document platen 203 on which a document 250 is placed, and a supporting member 204 that supports the area sensor 201 and the illumination device 205. The document platen 203 has a black colored area set as a document place area of which an area size is larger than the largest document size as illustrated in FIGS. 12A to 12G, which will be described later. The document place area has white lines crossed with each other at the center of the document place area, so that the lines divide the document place area into four areas.

Additionally, the support member 204 is provided with a display 501 at a base position. The display 501 displays a moving image captured with the area sensor 201. The display 501 is provided at the base position here, however, may be provided anywhere on the support member 204. When the display 501 is located at the base portion of the support member 204, an amount of movement of eyes of a user between the document 250 and the display 501 is the smallest. The amount of movement of eyes is preferably made small in consideration of user's work. The area sensor 201 includes a two-dimensional imaging element, and has a function to capture an image of an object. More specifically, for example, a camera including the two-dimensional imaging element can be used for the area sensor 201.

In an example of FIG. 2, the area sensor 201 positioned above the document platen 203 scans the document 250 set in a face-up state on the document platen 203. With the top shot scanner, such as the image reading device 102, in which a document is set in its surface up, projection of indoor illumination and reflection of shadow of a photographer himself or herself may appear on a read image (hereinafter, referred to as reflections from outside). To cope with the reflections from outside, the image reading device 102, according to the embodiment, includes the illumination device 205 that controls the reflections from outside. The illumination device 205 of the embodiment includes a plurality of light emitting diodes (LEDs) 202 disposed in two parallel directions each of which is at one side of a longitudinal direction of the area sensor 201, and uses LED lighting. The illumination device 205 lights on and off according to a scan instruction from the user.

The image reading device 102, according to the embodiment, scans the document 250 as follows. At first, the user places the document 250, which may have a plurality of pages, on the document platen 203 and opens a page of the document 250 where the user wants to scan, and presses a start key of the control panel 114. This causes the illumination device 205 to light on, and then the document 250 is scanned. After that, the user repeats the operation of turning over a page of the document 250 and pressing the start key. This allows the user to continuously scan several pages in the document 250. In addition to that, the user can select an operation, with the control panel 114, regarding data of read image which is scanned, for example, the user can select an operation of outputting a hard copy of the read image, or an operation of outputting the read image to a storage device such as a hard disc drive (HDD).

Figure 3:
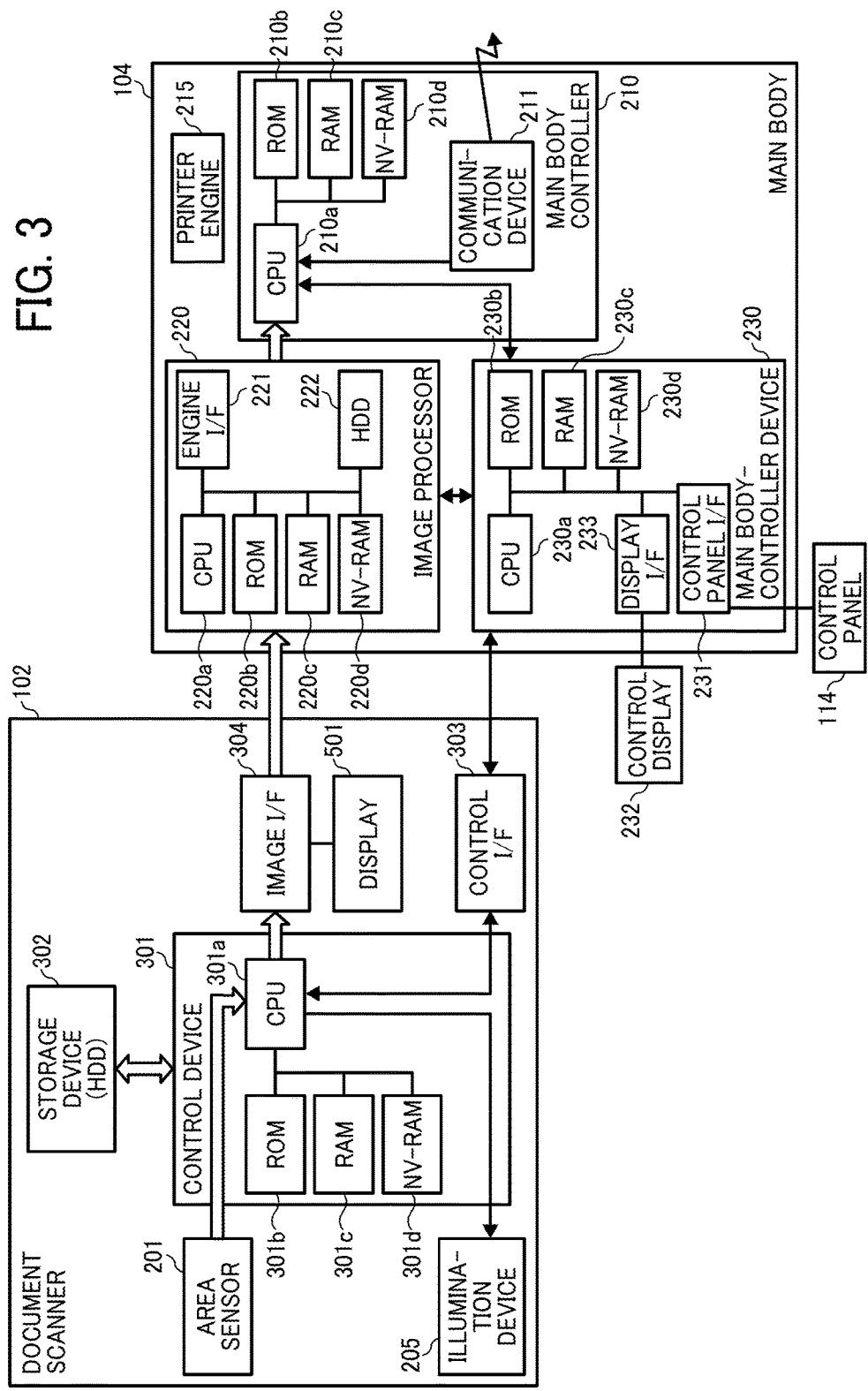
FIG. 3 is a block diagram illustrating a hardware configuration of the image forming apparatus of FIG. 1.

FIG. 3 is a block diagram illustrating a hardware configuration of the image forming apparatus 100 of FIG. 1. In FIG. 3, the image forming apparatus 100 is configured with the main body 104 and the document scanner 102.

The document scanner 102 includes a control device 301, a storage device 302, a control interface (hereinafter, an interface may be referred to as I/F) 303, an image I/F 304, the area sensor 201, and the illumination device 205.

The control device 301 controls devices including the area sensor 201 and the illumination device 205, and performs image processing. The storage device 302 includes, for example, a high-capacity memory such as an HDD that is able to store a large amount of readable and writable data such as image data. The control I/F 303 communicates with the main body 104 to transfer control instructions. The image I/F 304 is communicates with the main body 104 to transfer image data. The image I/F 304 also serves as an interface to the display 501, which is provided on the support member 204, for displaying an image.

The control device 301 includes a central processing unit (CPU) 301*a*, a read only memory (ROM) 301*b*, a random access memory (RAM) 301*c*, and a non-volatile (NV)-RAM3 301*d*. The ROM 301*b* stores a program for managing data in the document scanner 102 and controlling peripheral devices. The CPU 301*a* performs a predetermined processing according to the program stored in the ROM 301*b*. The RAM 301*c* serves as a work memory when the CPU 301*a* performs the predetermined processing according to the program. The RAM 301*c* is also used as, for example, a buffer to temporarily store data from the area sensor 201 and a memory to process the data stored in the buffer. The NV-RAM 301*d* stores data that is desired to be stored in a power-off state.

The main body 104 includes a main body controller 210, an image processor 220, and a main body-controller device 230. The main body controller 210, the image processor 220, and the main body-controller device 230 respectively include, as well as the control device 301, CPUs 210*a*, 220*a*, and 230*a*, ROMs 210*b*, 220*b*, and 230*b*, RAMs 210*c*, 220*c*, and 230*c*, and NV-RAMs 210*d*, 220*d*, and 230*d*. Each of these elements has the same function with each corresponding element in the control device 301. The control device 301, the image processor 220, and the main body-controller device 230 may use an application specific integrated circuit (ASIC) to replace a desired part, if necessary. Additionally, the main body-controller 210 includes a communication device 211 to communicate with the outside.

The main body 104 also includes a printer engine 215 including an image forming elements, such as the image forming device 105 and the like. The image processor 220 controls the printer engine 215 to form an image on the recording sheet. The image processor 220, accordingly, includes the CPU 220*a* and an engine I/F 221, and transfers a signal to control the printer engine 215 to the printer engine 215 through the engine I/F 221 and receives from the printer engine 215 information needed to form the image. The image processor 220 also includes an HDD 222 as a storage device to store the information and a program for forming the image.

The main body 104 includes the control panel 114 and a control display (display) 232. The control panel 114 and the control display 232 are communicatively connected to the main body-controller device 230 through a control panel I/F 231 and a display I/F 233, respectively.

Figure 4:
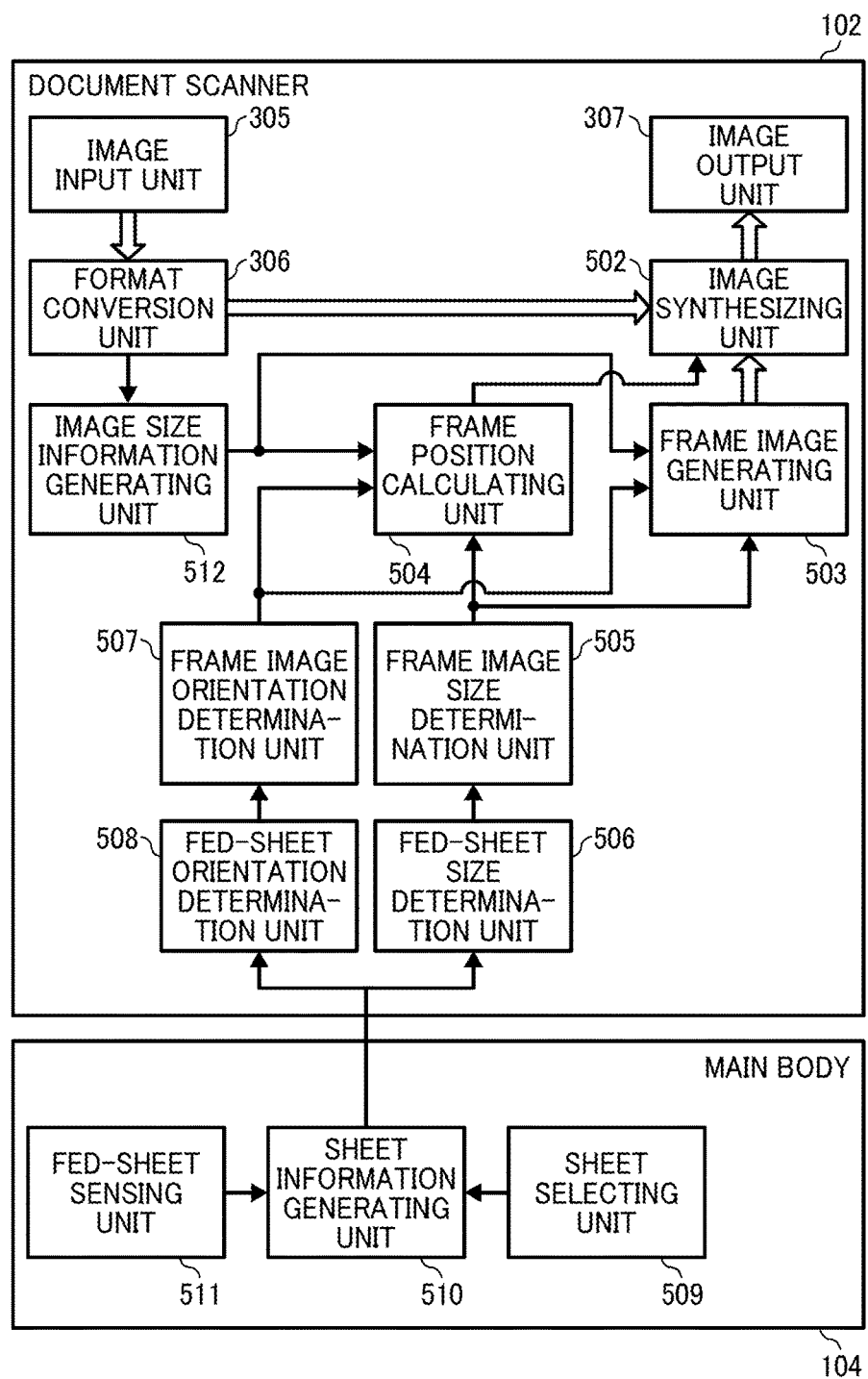
FIG. 4 is a block diagram illustrating a functional configuration of the image forming apparatus including the document scanner, in displaying a moving image indicating a printing-area according to one embodiment.

FIG. 4 is a block diagram illustrating a functional configuration of the image forming apparatus 100 including the document scanner 102 displaying a moving image indicating a printing-area according to one embodiment.

The main body 104 includes functional units including a sheet selecting unit 509, a fed-sheet sensing unit 511, and a sheet information generating unit 510. The fed-sheet sensing unit 511 has a function to detect a size and an orientation of a sheet set on the sheet-feeding tray 103*a* of the sheet-feeding device 103. The sheet information generating unit 510 generates sheet information based on a size of a print sheet for the document selected by the user with the sheet selecting unit 509, and the size and the orientation of the fed-sheet detected with the fed-sheet sensing unit 511.

More specifically, the sheet selecting unit 509 generates the information including the size of the print sheet for the document based on an operation of the user selecting, from an operation screen of the control panel 114, a size, for example, "A4/horizontal", "A4/vertical", "A3" or the like. The control panel 114 has a liquid crystal display screen.

The fed-sheet sensing unit 511 detects a sheet size by sensing positions of, for example, an end fence 511*a* and a side fence 511*b* set on the sheet-feeding tray 103*a* of the sheet-feeding device 103. This will be explained more with reference to FIGS. 10A, 10B, and 10C later. The fed-sheet sensing unit 511 may be provided as, for example, a plurality of reflection sensors set in the sheet-feeding tray 103*a* of the sheet-feeding device 103. The plurality of reflection sensors detect the size and the orientation of the sheet using reflection of light of the sensors when the sheet-feeding tray 103*a* is closed.

As a result of the detection of the size and the orientation, the information, for example, "A4/vertical" for a first tray, "A4/horizontal" for a second tray and the like, is generated, according to the number of the sheet-feeding trays 103*a* included in the image forming apparatus 100.

The sheet selecting unit 509 inputs information of "A3" to the sheet information generating unit 510 when the user selects "A3" with the control panel 114. The fed-sheet sensing unit 511 inputs the information of all of the sheet-feeding trays 103*a* to the sheet information generating unit 510. When the image forming apparatus 100 has four sheet-feeding trays 103*a*, an example of the information of all of the four sheet-feeding trays 103*a* may be as follows:

first sheet-feeding tray: "A4/vertical"
second sheet-feeding tray: "A4/horizontal"
third sheet-feeding tray: "A3/horizontal"
fourth sheet-feeding tray: "A4/vertical"

The sheet information generating unit 510 generates two pieces of information, (1) and (2) as described below, based on the information of "A3" input from the sheet selecting unit 509 and the information input from the fed-sheet sensing unit 511, and then inputs the two pieces of information, (1) and (2), as sheet information to the document scanner 102.

(1) the largest sheet-feeding tray is the third sheet-feeding tray: "A3/horizontal"
(2) a sheet-feeding tray corresponding to a print sheet selected for the document is the third sheet-feeding tray: "A3/horizontal"

Here, when the sheet selecting unit 509 selects "A4/horizontal" or others, a content of the information of (2) is changed.

The document scanner 102 has functional units including an image input unit 305, a format conversion unit 306, an image output unit 307, an image synthesizing unit 502, a frame image generating unit 503, a frame position calculating unit 504, a frame image size determination unit 505, a fed-sheet size determination unit 506, a frame image orientation determination unit 507, a fed-sheet orientation determination unit 508, and an image size information generating unit 512.

The image input unit 305 receives image data (image signal) input from the area sensor 201 and stores the received image data in the storage device 302. The format conversion unit 306 converts the input image data into a red, green, and blue (RGB) format when the input image data is not in the RGB format. As one example of the conversion, the format conversion unit 306 performs general calculation processing on an image of YCbCr422 format and converts the image into image data of RGB888 format.

The fed-sheet size determination unit 506 determines a size of a fed-sheet based on the sheet information generated by the sheet information generating unit 510 in the main body 104. The frame image size determination unit 505 determines a size of a frame image according to the size of the fed-sheet determined by the fed-sheet size determination unit 506. The fed-sheet orientation determination unit 508 determines an orientation of the fed-sheet based on the sheet information. The frame image orientation determination unit 507 determines an orientation of the frame image according to the orientation of the fed-sheet determined by the fed-sheet orientation determination unit 508.

The frame image size determination unit 505 sends frame image size information, which includes the size determined by the frame image size determination unit 505, to the frame position calculating unit 504 and the frame image generating unit 503. In addition, the frame image orientation determination unit 507 sends frame image orientation information, which includes the orientation determined by the frame image orientation determination unit 507, to the frame position calculating unit 504 and the frame image generating unit 503. The image size information generating unit 512 generates image size information using the image data, which is converted with the format conversion unit 306, and resolution of the area sensor 201, and sends the generated image size information to the frame position calculating unit 504 and the frame image generating unit 503.

In the description of the embodiment, the image size of the image size information is to be fixed, however, when the area sensor 201 has a zoom function such as an enlargement and reduction function or when the supporting member 204 is movable (extendable), an image size changes. In such a condition, the image size information generating unit 512 generates the image size information according to change of the image size.

Figure 5:
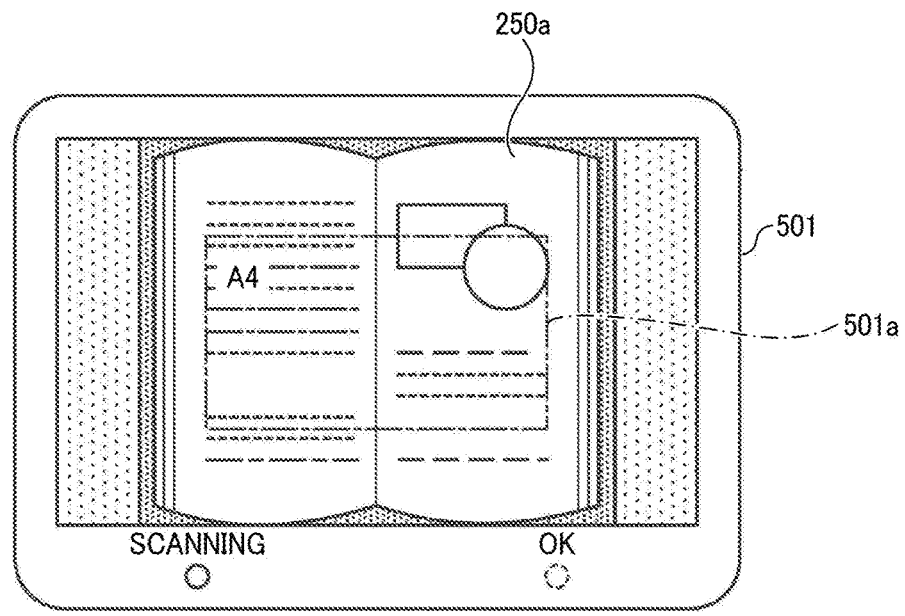
FIG. 5 is a diagram illustrating an exemplary screen of a display, when a sheet of A4/horizontal is selected in relation to a document of A3 size according to one embodiment.
Figure 6:
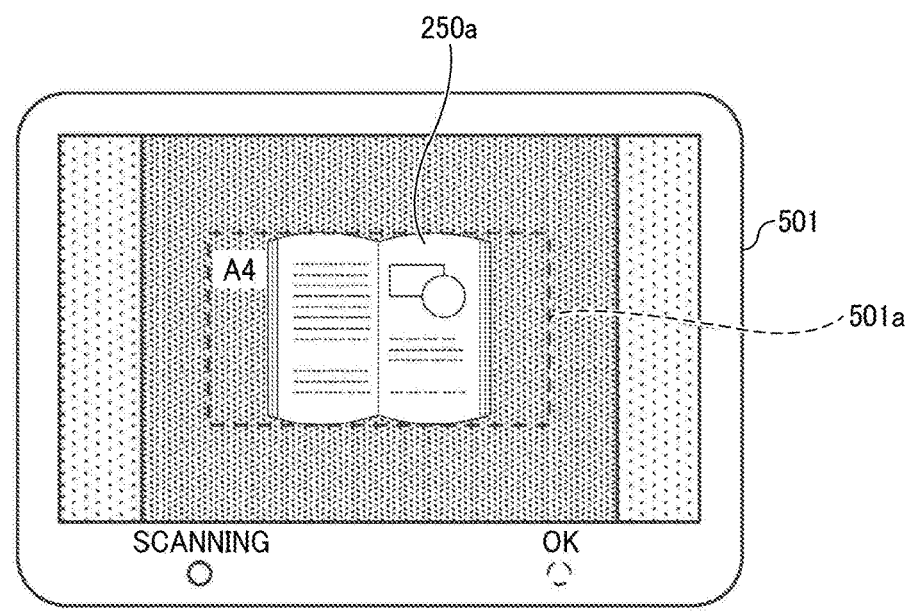
FIG. 6 is a diagram illustrating an exemplary screen of the display, when a size of the document of A3 size in FIG. 5 is reduced.

FIG. 5 is a diagram illustrating an exemplary screen of the display 501, when a sheet of A4/horizontal is selected in relation to a document of A3 size. FIG. 6 is a diagram illustrating an exemplary screen of the display 501, when a size of the document of A3 size in FIG. 5 is reduced. "A sheet of A4/horizontal is selected" means that the user selects "A4/horizontal" via the liquid crystal screen of the control panel 114. A frame image 501a in FIGS. 5 and 6 is a frame image in each situation as described above. In such situations, scaling factor of the image of the document is from A3 to A4, and this reduction is instructed with the control panel 114. As described in FIG. 6, a frame size of the frame image 501a remains as A4/horizontal. On the other hand, the image of the document 250 is processed to reduce its size to be displayed. Alternatively, even when a scaling factor of the image is not designated, but determined arbitrarily, the size of the image is reduced according to the scaling factor and the size of the document image displayed varies, accordingly. Through this, whether the document is within the frame can be seen. This scaling processing to change the size of the document image is performed with the CPU 220a (printer controller) of the image processor 220 in response to an input from the control panel 114.

In FIGS. 5 and 6, each frame image 501a is indicated by a different type of line. This is because the frame image 501a is indicated with a "red" line when, for example, the document image 250a is larger than the frame image 501a as illustrated in FIG. 5, otherwise when the document image 250a is smaller than the frame image 501a as illustrated in FIG. 6, the frame image 501a is indicated with a "blue" line. That is, the red line indicates that the image of the document 250 is too large to cover the all area to be read so that the read data is not suitable for use, and the blue line indicates that the all image of the document 250 can be read to generate a usable read data. That is, the two colors are used depending on whether the document image 250a is within the frame image 501a. This allows the user to recognize whether the read data of the document is usable by checking the color of the frame image 501a.

The image synthesizing unit 502 has a function to synthesize the image data converted with the format conversion unit 306 with frame image data generated with the frame image generating unit 503 and generate synthesized image data. The image synthesizing unit 502 performs synthesizing processing based on position information that is calculated with the frame position calculating unit 504. The display 501 displays the synthesized image data. The display 501 displays the synthesized image data to enhance convenience of the user, here, however, the embodiments are not limited to this, but the synthesized image data may be transferred to the main body 104 and the control panel 114 may display the synthesized image data. The display 501 is provided, for example, at the base portion on a surface of the support member 204, which is facing to the user. By providing the display 501 at this position, the user can see both of a set document and a screen of the display 501 displaying a frame image and a document image, easily at the same time.

Figure 7:
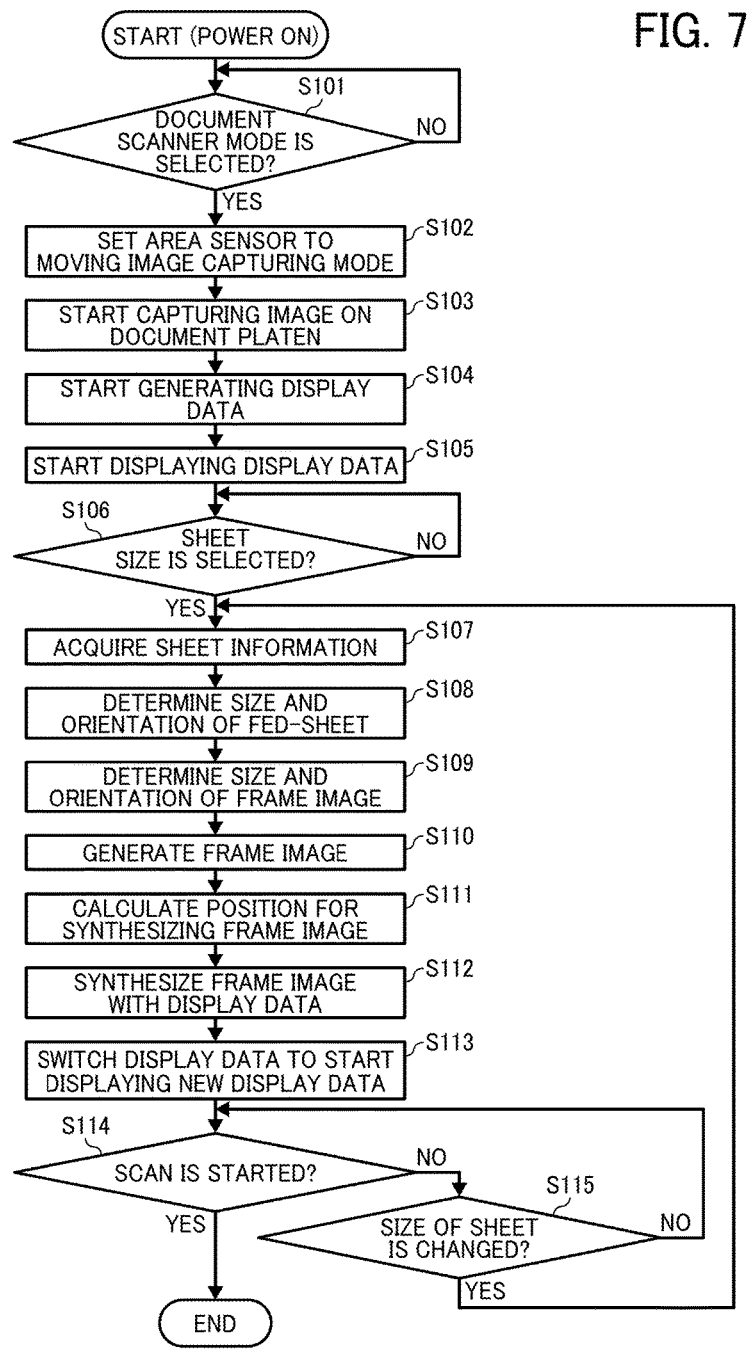
FIG. 7 is a flowchart illustrating control operation performed by a central processing unit (CPU) of the document scanner.

FIG. 7 is a flowchart illustrating a process performed by the CPU 301a of the document scanner 102 by using each function illustrated in FIG. 4.

After being powered on, the image forming apparatus 100 is in a stand-by state waiting for an operation by the user. The process of the flowchart starts when the user selects a document scanner mode with the control panel 114 (S101). Besides the document scanner mode, there are a copy mode, a scanner mode, etc., which are known techniques so that the explanation thereof are omitted here.

When the user selects the document scanner mode (S101: Yes), the CPU 301a of the control device 301 sets the area sensor 201 in a moving image capturing mode with which the area sensor 201 periodically acquires still images to generate the moving image (S102). The area sensor 201 captures the image, which is moving data, on the document platen 203 and transfers the moving data (image signal) to the control device 301. The CPU 301a of the control device 301 stores the received moving data to the storage device 302 (S103). At this time, the data captured by the area sensor 201 in the moving image capturing mode is used to indicate to the user a read area of the document in relation to a print sheet, so that a hard copy of the data is not output. The area sensor 201 being in the moving image capturing mode, accordingly, has lower resolution than the area sensor 201 scanning the document in response to an event that the user presses the start key to start a scan of the document with the control panel 114.

The CPU 301a of the control device 301 edits the image data according to a display size and a display timing of the display 501 and generates display data so that the display 501 displays the moving data stored in the storage device 302. More specifically, the CPU 301a reduces an image size of the moving data to be fit with the display size of the display 501 when the image size is larger than the display size (S104). After completing preparation of the display data, the CPU 301a starts transferring the display data to the display 501, and the display 501 displays the display data received (S105).

The CPU 301a checks whether the user selects a size of the print sheet for the document with the control panel 114 (sheet selecting unit 509) (S106). When the size of the print sheet for the document is not selected yet, the image forming apparatus 100 is in the stand-by state (S106: No), whereas when the size of the print sheet for the document is selected, the process continues to the next step (S106: Yes).

The CPU 230a of the main body-control device 230 having a sheet information generating unit 510 transfers the sheet information to be used at the sheet-feeding tray 103a to the CPU 301a of the control device 301 in the document scanner 102. The sheet information used at the sheet-feeding tray 103a is generated with the sheet information generating unit 510 based on information on the sheet size selected with the sheet selecting unit 509 of the control panel 114 and the fed-sheet information from the fed-sheet sensing unit 511.

The CPU 301a of the control device 301 determines a size and an orientation of a sheet, based on the obtained sheet information, using the fed-sheet size determination unit 506 and the fed-sheet orientation determination unit 508 (S108). Subsequently, the CPU 301a determines a size and an orientation of the frame image to be added to the display data using the frame image size determination unit 505 and the frame image orientation determination unit 507 (S109).

Figure 8A:
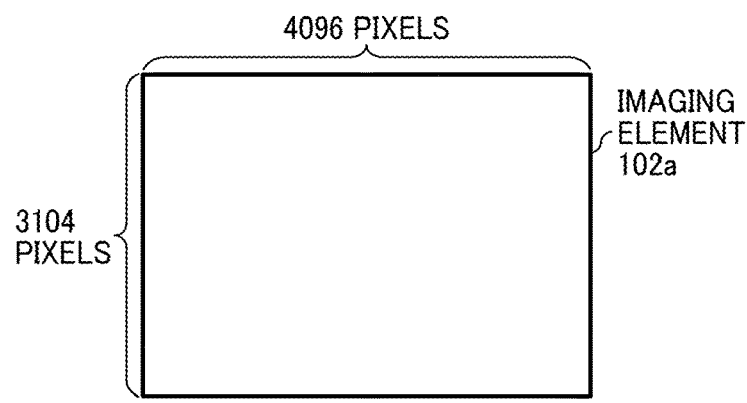
FIGS. 8A, 8B, and 8C are diagrams illustrating a relationship among a size of an imaging element, a size of the display, and a size of a sheet used to determine a size and an orientation of a frame image in FIG. 7.
Figure 8B:
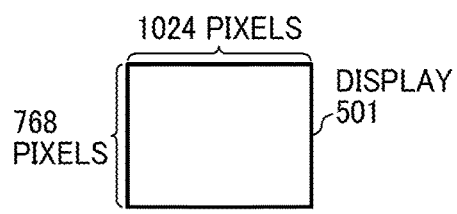
Figure 8C:
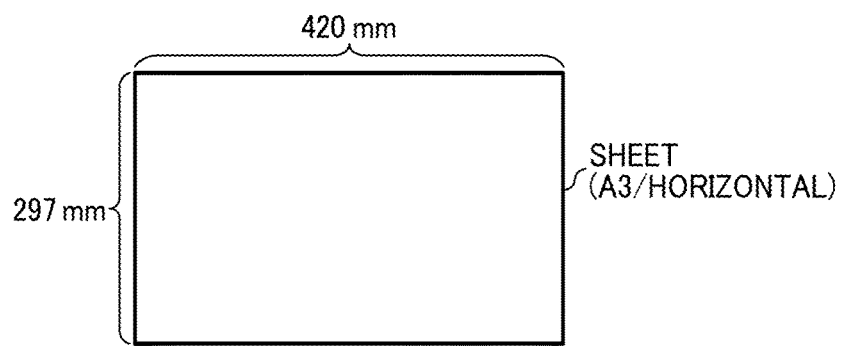

The details of a determination process of the size and the orientation of the frame image in S109 will be described below. FIGS. 8A, 8B, and 8C are diagrams illustrating a relationship among a size of an imaging element (image data) (FIG. 8A), a size of the display 501 (FIG. 8B), and a size of the sheet (FIG. 8C).

The area sensor 201 has information on the size and resolution of the display 501. The CPU 301a of the control device 301 generates the frame image 501a by comparing the sheet information input from the sheet information generating unit 510 to the information including the size and the resolution of the display 501. For example, when the display 501 has a size of 7 inch (7-inch liquid crystal display) and resolution of 1024 pixels*768 pixels a, and the sheet-feeding tray is "A3/horizontal", the size information on the maximum fed-sheet is "A3/horizontal" as described in FIG. 8. Under this condition, the following satisfies.
A3 sheet size: vertical 297*horizontal 420 (mm)
display size: vertical 768*horizontal 1024 (pixels)
vertical rate ≥768/297≈2.592.5 (round off the 2nd decimal point to display the image within the display)
horizontal rate ≥1024/420=2.43≈2.4 (round off the 2nd decimal point to display the image within the display)
the minimum rate from vertical rate and the horizontal rate ≥2.4
As a result, the maximum size of the image of the document 250 to be displayed is as follows.
vertical: 297*2.4=712 (pixels)
horizontal: 420*2.4=1008 (pixels)

According to the maximum size of the image of the document to be displayed, the size of the frame image 501a is determined. The frame image 501a is A3/horizontal and has vertical 712*horizontal 1008 (pixels). In the situation of "A4/vertical", the frame image 501a has a half horizontal width and has vertical 712*horizontal 504 (pixels).

The following is the case for the imaging element of the area sensor 201.
read size: horizontal 4096 (pixels)*vertical 3014 (pixels)
vertical rate ≥3014/768=4.04≈4.0 (round off the 2nd decimal point)
horizontal rate ≥4096/1024=4
This means that image information read with the imaging element can be displayed after reducing its size to the size of display 501.

The CPU 301a of the control device 301 generates frame image data, namely, frame image 501a with the frame image generating unit 503 (S110). Subsequently, the CPU 301a generates information on an image size of the moving data with the image size information generating unit 512. Subsequently, the CPU 301a calculates a position on which the frame image 501a is synthesized, using the frame position calculating unit 504 based on the frame image size information from the frame image size determination unit 505, the frame image orientation information from the frame image orientation determination unit 507, and the generated image size (S111).

The CPU 301a generates the frame image 501a using the frame image generating unit 503 and then synthesized the moving data stored in the storage device 302 with the frame image data according to the size information of the moving data using the image synthesizing unit 502 and stores in the storage device 302 (S112).

Figure 9:
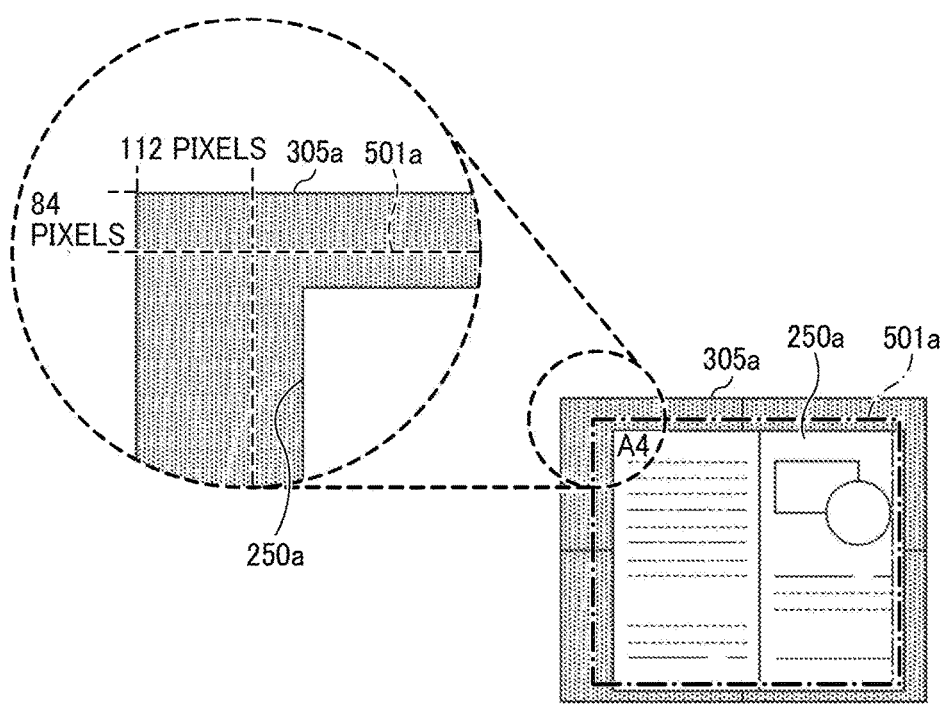
FIG. 9 is a diagram for explaining synthesizing moving data with frame image data in FIG. 7.

FIG. 9 is a diagram illustrating an example for synthesizing the moving data with the frame image data in S112 of FIG. 9. In FIG. 9, when the size of the moving data is 1024 pixels*768 pixels, and the frame image 501a is 800 pixels*600 pixels, 1024−800=224 (pixels) is outside of the frame image 501a in a horizontal direction. That is, at one side of the horizontal direction, 224/2=112 (pixels) is outside of the frame image 501a. A 113rd pixel is, namely, inside of the frame image 501a. Similarly, (768−600)/2=84 (pixels) is outside of the frame image 501a at one side in a vertical direction, so that an 85th line is inside of the frame image 501a. As illustrated in FIG. 9, the image data, accordingly, is synthesized with the frame image 501a in a manner that the 113rd pixel from the left edge and located in the 85th line from the top is positioned at the upper left of the frame image 501a.

After completing generating the display data in which the image data is synthesized with the frame image 501a, the CPU 301a of the control device 301 switches a screen of the display 501 to the generated display data (S113).

The display 501 then continues displaying the display data until the user press the start key of the control panel 114 (S114: No). If the selected sheet size is changed by a time when the start key is pressed after S113, (S115: Yes), the process returns to the S107 to obtain the information of the selected sheet size again, and repeats the process after S107. If the selected sheet size is not changed (S115: No), the image forming apparatus 100 waits until the the user press the start key, and then starts scanning when the start key is pressed to complete the process.

FIGS. 10A, 10B, and 10C are diagrams each illustrating a relationship among a state of sheet set on the sheet-feeding tray 103a, a state of frame image 501a displayed with the display 501, and a state of moving image (document image 250a) displayed with the display 501.

The fed-sheet sensing unit 511 is installed in the sheet-feeding tray 103a of the sheet-feeding device 103 and has the function to detect a size and an orientation of a sheet set on a sheet-feeding tray 103a (fed-sheet). The fed-sheet sensing unit 511 defines the sheet size by detecting positions of, for example, the end fence 511a and the side fence 511b in the embodiment. For example, when the sheet of A3 size is set on, a set orientation of the sheet is fixed according the size of the sheet so that the end fence 511a and the side fence 511b are set as described in FIG. 10A. When the sheet has an A4 size, the sheet is set on either in a horizontal direction or in a vertical direction, so that one of the end fence 511a and the side fence 511b becomes shorter than the other fence according to the set orientation, and thereby the orientation can be detected. FIG. 10B illustrates when the sheet is A4/vertical, and FIG. 10C illustrates when the sheet is A4/horizontal.

The sheet-feeding tray 103a in FIGS. 10A to 10C includes a first sensor that senses a position of the end fence 511a and a second sensor that senses a position of the side fence 511b.

The first sensor and the second sensor sense each position and generates the frame image 501a to be displayed based on the sensed positions, using the frame image generating unit 503. The position of the side fence 511b is associated with a length of the vertical direction of the frame image 501a, and the position of the end fence 511a is associated with a length of the horizontal direction of the frame image 501a. When the positions of the side fence 511b and the end fence 511a do not fit with a standard sheet size, this indicates that the sheet is not set on the sheet-feeding tray 103a properly so that the display 501 displays warning that gives an instruction to the user, for example, to reset the sheet on the sheet-feeding tray 103a.

In FIGS. 10A to 10C, a diagram at the left side illustrates an exemplary state of the sheet-feeding tray 103a, a diagram at the middle illustrates an exemplary screen with the frame image 501a displayed with the display 501, and a diagram at the right side illustrates an exemplary screen with the frame image 501a and document image 250a displayed with the display 501.

Figure 11:
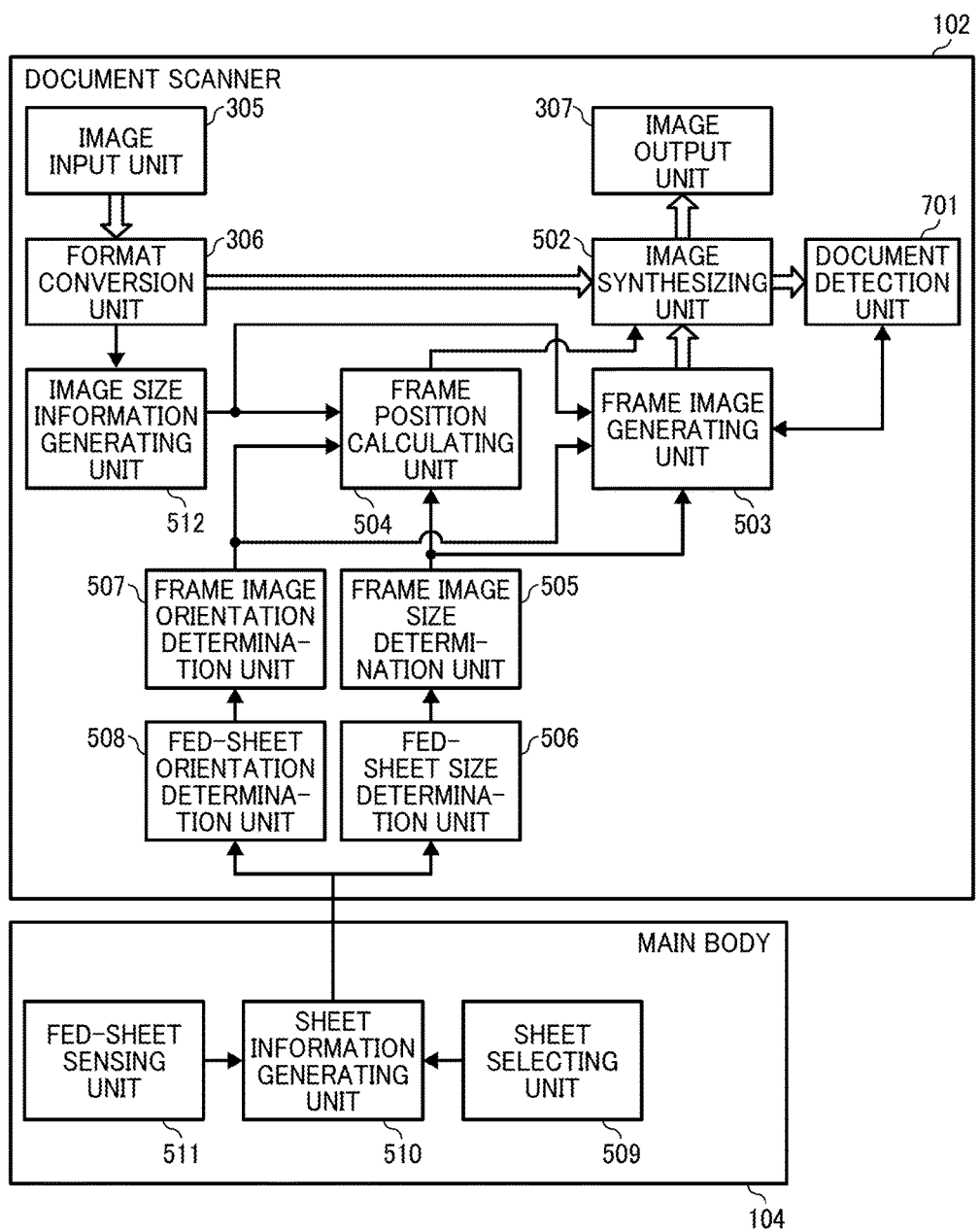
FIG. 11 is a block diagram illustrating a functional configuration of an image forming apparatus to which a document detection unit is added to the configuration of the document scanner in FIG. 4.

FIG. 11 is a block diagram illustrating a functional configuration in which a document detection unit 701 that detects a position of the document is added to the configuration of FIG. 4.

The document detection unit 701 is a function unit that determines whether the image of the document 250 is captured appropriately in relation to the frame image 501a that is synthesized with the input image input from the image input unit 305, using the image synthesizing unit 502. The document detection unit 701 is configured as a software program executed by the CPU 301a of the control device 301. The other functional units illustrated in FIG. 11 are the same with the functional units illustrated in FIG. 4 so that the explanation thereof is omitted.

Figure 12A:
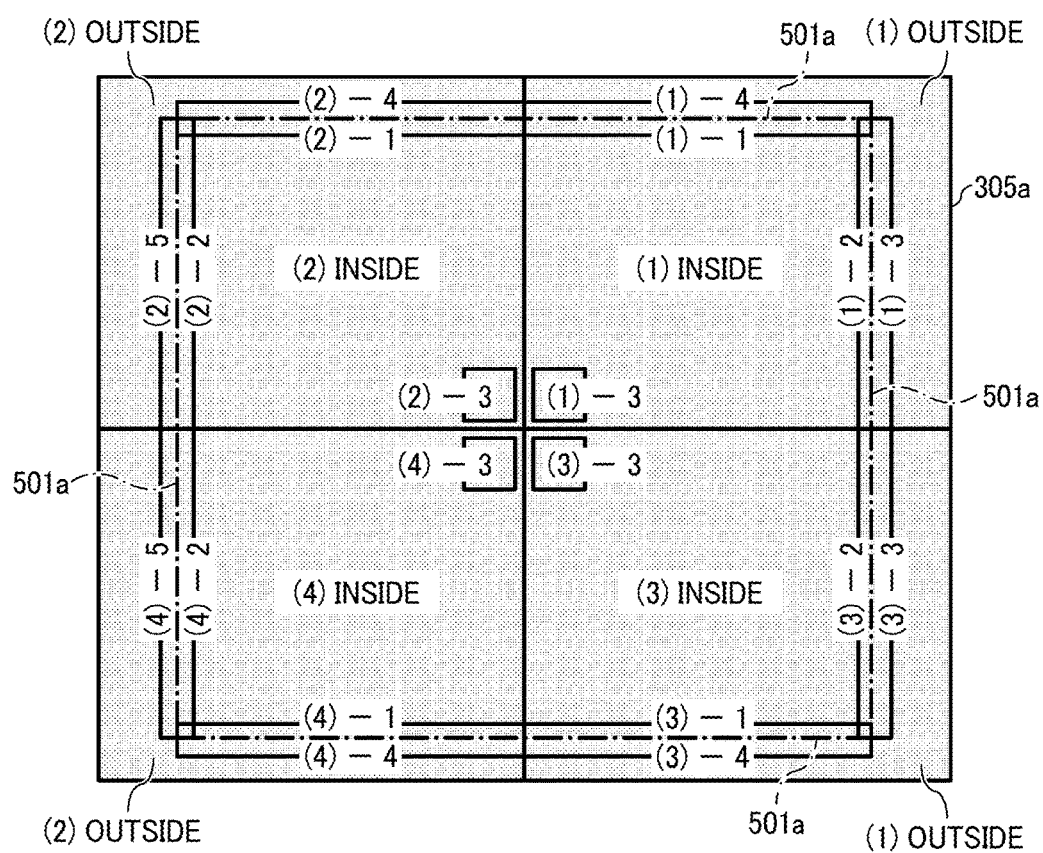
FIGS. 12A to 12G are diagrams each illustrating a state of screen of the display for detecting a document with the document detection unit of FIG. 11.
Figure 12B:
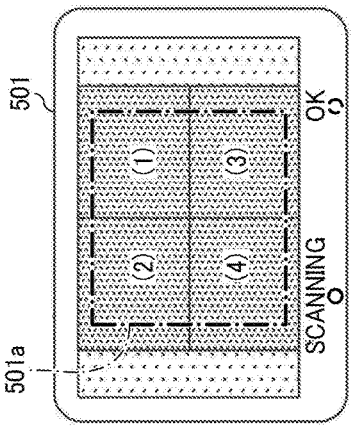
Figure 12C:
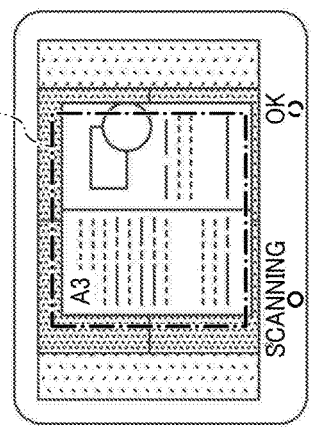
Figure 12D:
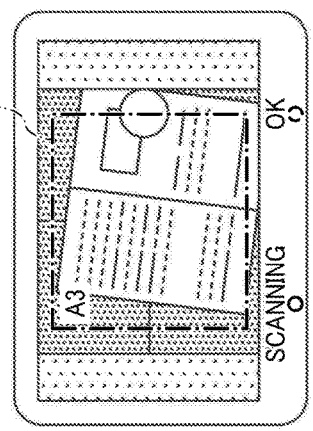
Figure 12E:
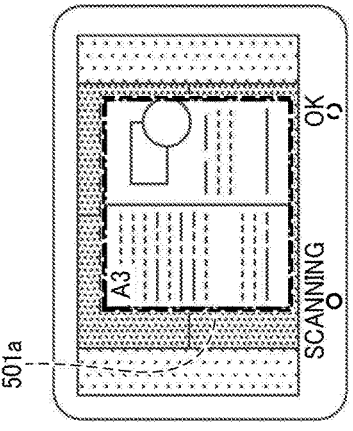
Figure 12F:
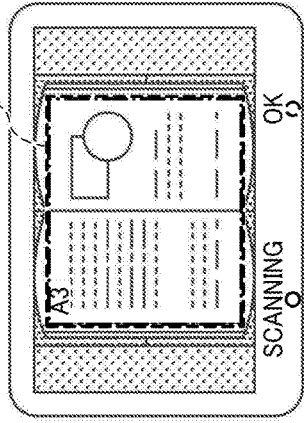
Figure 12G:
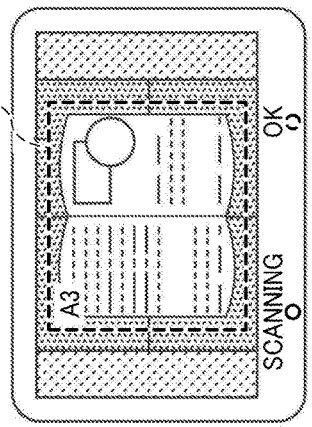

FIG. 12A illustrates area division of the image data. FIGS. 12B to 12G are diagrams each illustrating an exemplary state of a screen of the display 501 for detecting a document with the document detection unit 701. FIG. 12B illustrates an exemplary state, in which when there is no document. FIG. 12C illustrates an exemplary state, in which displacement 1 of the document occurs. FIG. 12D illustrates an exemplary state, in which displacement 2 of the document occurs. FIG. 12E illustrates an exemplary state, in which OK 1 is determined so that the document is placed correctly. FIG. 12F illustrates an exemplary state, in which OK 2 is determined so that the document is placed correctly. FIG. 12G illustrates an exemplary state, in which OK 3 is determined so that the document is placed correctly.

The document detection unit 701 performs detection on the image data having four divided areas, a first area (1) to a fourth area (4), as illustrated in FIG. 12A. In the detection with the document detection unit 701 of the embodiment, each area of the first area (1) to the fourth area (4) has an inside area of the frame image 501a and an outside area of the frame image 501a. That is, the area of the image data has divided eight areas including a first area (1)/outside, a first area (1)/inside, and the like.

At first, the document detection unit 701 determines whether color information of pixels included in the first area (1)/inside and being adjacent to the frame image 501a indicates black. When the color information of the pixels included in the first area (1)/inside and located under the frame image 501a ((1)-1) indicates "black", the document detection unit 701 determines that the document 250 is not placed in an upper side within the frame. When the color information of the pixels included in the first area (1)/inside and located left side of the frame image 501a ((1)-2) indicates "black", the document detection unit 701 determines that the document 250 is not placed in a right side within the frame. In FIG. 12, "black" is indicated by a dot pattern with dark color. Additionally, an area of "black" 305a is a document-placing area where the document is to be placed. The document-placing area 305a is set in advance with the document platen 203 of the document scanner 102, and included in the input image data input from the image input unit 305 to be used for determining a position of a document.

The second area (2)/inside, the third area (3)/inside, and the fourth are (4)/inside are checked as well as the first area (1)/inside. The document detection unit 701 determines, regarding the second area (2)/inside, whether the document 250 is on an upper side ((2)-1) and a left side ((2)-2). The document detection unit 701 determines, regarding the third area (3)/inside, whether the document 250 is on a right side ((3)-2) and a lower side ((3)-1). The document detection unit 701 determines, regarding the fourth area (4)/inside, whether the document 250 is on a left side ((4)-2) and a lower side ((4)-1).

In the state of FIG. 12B, the document detection unit 701 detects "black" with the color information of the pixels included in the first area/(1) inside to the fourth area (4)/inside. With this state, the document detection unit 701 determines that there is no document 250 around the frame image 501a.

When determining that there is no document 250 around the frame image 501a, the document detection unit 701 continues checking whether there is the document 250 in the center of the area. The center of the area corresponds to object areas in the first area (1)/inside to fourth area (4)/inside, which includes a lower left of the first area (1)/inside ((1)-3), a lower right of the second area (2)/inside ((2)-3), a upper left of the third area (3)/inside ((3)-3), and a upper right of the fourth area (4)/inside ((4)-4). In consideration of false detection due to, for example, marking on the document platen 203, a detection range of each object area of the first area (1)/inside to the fourth area (4)/inside has several pixels (here, 10 pixels) from a boundary of the object area, so that the detection range does not include any marking.

The document detection unit 701 checks whether the color information of pixels in the range of ((1)-3, (2)-3, (3)-3, and (4)-3)) of the first area (1)/inside to the fourth area (4)/inside, which is the center of the area 305a indicates "black". When the above-mentioned determination is black, this means that the document 250 is not on the center of the area 305a either, so that the document detection unit 701 determines that there is no document 250 within the frame image 501a and set the color of the frame image 501a to, for example, red. The document detection unit 701 notifies the frame image generating unit 503 of the situation described above.

On the other hand, when the document detection unit 701 determines the color information indicating "non-black" in the range of ((1)-3, (2)-3, (3)-3, and (4)-3)) of the first area (1)/inside to the fourth area (4)/inside and thus determines that the document 250 is within the frame image 501a, the document detection unit 701 sets the color of the frame image 501a to, for example, blue and notifies the frame image generating unit 503 of this. The state of the screen under this situation is illustrated in FIG. 12G.

The following describes when the document 250 is around the frame image 501a.

When detecting that the color information of the pixels included in the first area (1)/inside to the fourth area (4)/inside and being adjacent to the frame image 501a ((1)-3, (2)-3, (3)-3, and (4)-3)), indicates "non-black", the document detection unit 701 determines that the document 250 is on that portion and the document 250 is within the frame image 501*a*.

At this time, if all color information of the pixels of all areas ((1)-3, (2)-3, (3)-3, and (4)-3)) indicates "non-black", the document detection unit 701 can determine that the document 250 is within the frame image 501*a*, and thus sets the color of the frame image 501*a* to blue and notifies the frame image generating unit 503 of this. The state of the screen under this situation is illustrated in FIGS. 12E and 12F.

When the color information of the pixels of at least one of the areas ((1)-3, (2)-3, (3)-3, and (4)-3)) indicate "black", this means that there is a possibility that the document 250 is not within the frame image 501*a*. Then the document detection unit 701 checks the color information of pixels in areas outside of the frame image 501*a* ((1)-4, (1)-5, (2)-4, (2)-5, (3)-4, (3)-5, (4)-4, and (4)-5).

The following is a table showing exemplary results obtained by checking the color information.

TABLE 1 list of results of document detection (first area (1))

| (1)-1 | (1)-2 | (1)-3 | (1)-4 | (1)-5 | result |
|---|---|---|---|---|---|
| black | black | black | — | — | no document |
| black | black | non-black | — | — | document |
| non-black | black | black | black | black | *1 |
| black | non-black | black | black | black | *1 |
| non-black | black | non-black | black | black | document |
| black | non-black | non-black | black | black | document |
| non-black | black | black | non-black | black | *1 |
| black | non-black | black | black | non-black | *1 |
| non-black | black | non-black | non-black | black | *2 |
| black | non-black | non-black | black | non-black | *3 |
| non-black | non-black | non-black | black | black | document |
| non-black | non-black | non-black | non-black | black | document |
| non-black | non-black | non-black | black | non-black | document |
| non-black | non-black | non-black | non-black | non-black | document |

*1: the document may be small size, so that the display 501 displays warning that gives an instruction of moving the document to the center marked on the document platen 203
*2: determination is performed by referring to result information on (3)-1, (3)-3, and (3)-4
when (3)-3 is "black" or (3)-3 is "non-black", and (3)-1 is "black", the result is *1
when (3)-1 and (3)-3 are "non-black", the result indicates that there is a document.
*3: determination is performed by referring to result information on (2)-2, (2)-3, and (2)-5
when (2)-3 is "black" or "non-black", and (2)-2 is "black", the result is *1.
when (2)-2 and (2)-3 are "non-black", the result indicates that there is a document In obtaining detection results other than the results in the table 1, the document detection unit 701 determines that there may be dust, dirt or the like on the document platen 203, and the display 501 displays warning that gives an instruction of cleaning of the document platen 203.

The results as shown in table 1 are also obtained for each of the second area (2) to the fourth area (4).

Regarding the second area (2), when the result of determination is *2, determination is performed by referring to result information on (4)-1, (4)-3, and (4)-4. Additionally, when the result of determination is *3, determination is performed by referring to result information on (1)-2, (1)-3, and (1)-5.

Regarding the third area (3), when the result of determination is *2, determination is performed by referring to result information on (1)-1, (1)-3, and (1)-4. Additionally, when the result of determination is *3, determination is performed by referring to result information on (4)-2, (4)-3, and (4)-5.

Regarding the fourth area (4), when the result of determination is *2, determination is performed by referring to result information on (2)-1, (2)-3, and (2)-4. Additionally, when the result of determination is *3, determination is performed by referring to result information on (3)-2, (3)-3, and (3)-5.

FIGS. 12C, 12D, and 12E illustrates examples of the results of determination.

Figure 13:
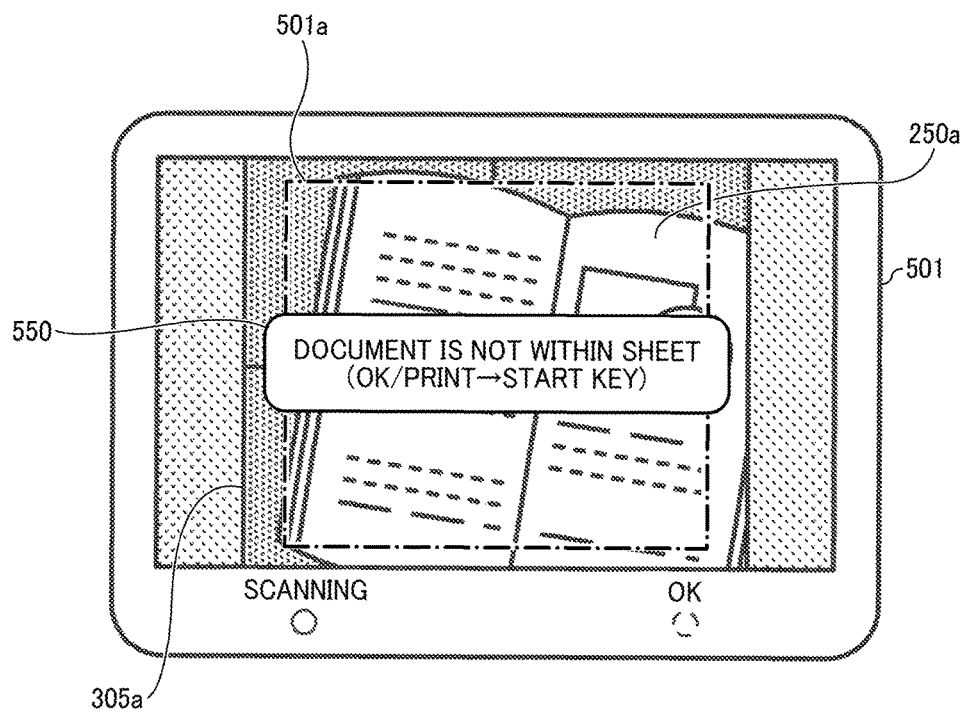
FIG. 13 is a diagram illustrating an exemplary screen displaying warning to notify a user of displacement of document so that the user can move the document to the center of a document platen.

Regarding the first area (1) in the state as illustrated in FIG. 12C, (1)-1 is black, (1)-2 is non-black, (1)-3 is non-black, (1)-4 is black, and (1)-5 is non-black so that the result of the determination is *3. That is, the document detection unit 702 determines the state of the first area (1) again by referring to the result information on (2)-2, (2)-3, (2)-5. Here, (2)-2 is black and (2)-3 is non-black, so that the result of determination of the first area (1) is *1. Regarding the second area (2), (2)-1 is black, (2)-2 is black, and (2)-3 is non-black, so that the result of determination indicates that there is a document. Regarding the third area (3), (3)-1 is non-black, (3)-2 is non-black, (3)-3 is non-black, and (3)-4 is non-black, and (3)-5 is non-black so that the result of determination indicates that there is a document. Regarding the fourth area (4), (4)-1 is non-black, (4)-2 is black, (4)-3 is non-black, (4)-4 is non-black, and (4)-5 is black so that the result of the determination is *2. That is, the document detection unit 702 determines the state of the fourth area (4) again by referring to the result information on (2)-1, (2)-3, and (2)-4. Here, (2)-1 is black and (2)-3 is non-black, so that the result of determination of the fourth area (4) is *1. Based on this result, the display 501 displays the warning that gives the instruction of moving the document 250 to the center marked on the document platen 203 (FIG. 13).

Regarding the first area (1) in the state as illustrated in FIG. 12D, (1)-1 is black, (1)-2 is non-black, (1)-3 is non-black, (1)-4 is black, and (1)-5 is non-black so that the result of the determination is *3. That is, the document detection unit 702 determines the state of the first area (1) again by referring to the result information of (2)-2, (2)-3, and (2)-5. Here, (2)-2 is black and (2)-3 is non-black, so that the result of the determination of the first area (1) is *1. Regarding the second area (2), (2)-1 is black, (2)-2 is black, and (2)-3 is non-black, so that the result of determination indicates that there is a document. Regarding the third area (3), (3)-1 is non-black, (3)-2 is non-black, (3)-3 is non-black, and (3)-4 is non-black, and (3)-5 is non-black so that the result of determination indicates that there is a document. Regarding the fourth area (4), (4)-1 is non-black, (4)-2 is black, (4)-3 is non-black, (4)-4 is non-black, and (4)-5 is black so that the result of the determination is *2. That is, the document detection unit 702 determines the state of the fourth area (4) again by referring to the result information on (2)-1, (2)-3, and (2)-4. Here, (2)-1 is black and (2)-3 is non-black, so that the result of determination of the fourth area (4) is *1. Based on this result, the display 501 displays the warning that gives the instruction of moving the document 250 to the center marked on the document platen 203 (FIG. 13).

Regarding the first area (1) in the state as illustrated in FIG. 12E, (1)-1 is non-black, (1)-2 is non-black, (1)-3 is non-black, (1)-4 is non-black, and (1)-5 is non-black so that the result of the determination indicates that there is a document. Regarding the first area (1), (2)-1 is non-black, (2)-2 is non-black, (2)-3 is non-black, (2)-4 is non-black, and (2)-5 is non-black so that the result of the determination indicates that there is a document. Regarding the third area (3), (3)-1 is non-black, (3)-2 is non-black, (3)-3 is non-black, and (3)-4 is non-black, and (3)-5 is non-black so that the result of determination indicates that there is a document. Regarding the fourth area (4), (4)-1 is non-black, (4)-2 is non-black, (4)-3 is non-black, (4)-4 is non-black, and (4)-5 is non-lack so that the result of the determination indicates that there is a document. The document detection unit 701 determines that there is a document based on the above-mentioned result and the document is read in a present state.

With the state as illustrated in FIGS. 12E, 12F, and 12G, the document detection unit 701 detects the document 250 (document image 250*a*) within the frame image 501*a*, and notifies the frame image generating unit 503 of the state to change the color of the frame image 501*a*. The frame image generating unit 503 changes information of the display data, here changes the color of the frame image 501*a* from red to blue, in response to receipt of the notification. The user, accordingly, can notice that the document 250 is set within the read range by seeing the screen, of the display 501, which reflects the display data.

FIG. 13 is a diagram illustrating an exemplary screen displaying a warning 550 to notify the user of displacement of the document 250. The user, accordingly, can move the document 250 to the center marked on the document platen 203. The display 501 displays the warning 550 having a massage of, for example, "printed image of the document is not within a sheet (OK and print: start key)". The warning 550 of FIG. 13 indicates that if the user wants the image of the document not to be within the sheet, the user presses the start key to start printing. Otherwise, the user resets the position of the document 250 by checking the screen of the display 501.

That is, when the display 501 displays the warning 550, notification for displaying the warning 550 is sent to the frame image generating unit 503, and the frame image generating unit 503 adds the warning 550, which gives an instruction to reset the position of the document 250, to the display screen of the frame image 501*a* in response to the receipt of the notification. Through this, the display 501 displays the synthesized image including the warning 550. The document detection processing, as described above, of the document detection unit 701 is performed after S112 in the flowchart of FIG. 7, where the frame image is synthesized with the display data. After the detection of the document, switching of the display data is started in S113.

The detection processing may be performed every time an image input, however this processing is assumed to have a large load. Accordingly, the document detection unit 701 may performs the detection processing with a certain interval that has cycles of the input operation. More specifically, when the image input unit 305 inputs the moving image with 30 frame/second (fps), the image is extracted once in a 30 fps and cases the document detection unit 701 to operate for that, so that a time taken to the detection processing reduced to ⅟30. That is, in the embodiment, the number of detection operation for the document 250 performed by the document detection unit 701 is set to be fewer than the number of input operations of the image performed by the area sensor 201 (input operation of the image data with the image input unit 305), namely, the number of detection operations for the document is fewer than the number of input operations of images. A detection processing time for the document accordingly shortens, and this enhances the responsiveness of the detection processing for the document.

The process performed by the image reading device 102 according to the embodiment described above is executed by the circuitry to execute software serving as the function units as illustrated in FIG. 4 and FIG. 11. The software is stored, as a program, in a storage media such as a storage device including HDD 302 and ROM 301*b*. The CPU 301*a* of the control device 301 in the document scanner 102 executes the program using the RAM 301*c* as a buffer or a work area.

Alternatively, a part of the program may be downloaded from a network via the communication lines to be executed by the CPU 301*a*

Figure 14:
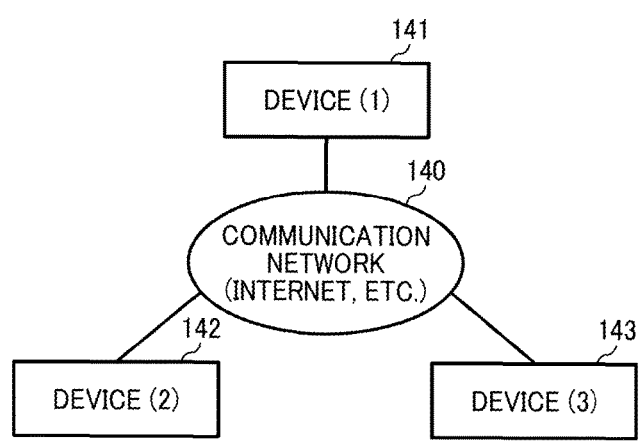
FIG. 14 is a diagram illustrating an exemplary configuration of distribution of a computer program to devices including a personal computer via a communication network such as the Internet.

The program also may be distributed, as illustrated in FIG. 14, to devices (1) 141, (2) 142, and (3) 143 such as personal computers via the storage media using a communication network such as the Internet.

That is, the program may be provided by being installed in advance to the hard disk serving as a storage media built-in the computer device. The storage media may store the program temporarily or permanently. The program may be installed in the computer as a unit, or may be provided as packaged software by using a portable storage media.

Such storage media includes, for example, a flexible disk, a compact disk read only memory (CD-ROM), a magneto optical (MO) disk, a digital versatile disk (DVD), a blu-ray disk (BD), a magnetic disk, and semiconductor memory.

The program may be downloaded from a download site via a network including a local area network (LAN) or the Internet and transferred to a computer using wired or wireless communication so that the program may downloaded in the storage device such as a hard disk built-in the computer.

As described above, the disclosure also provides the non-transitory storage media that stores the programs, in addition the image reading device.

The following describes the elements of each embodiment correspondingly to constituent features within a scope of the appended claims. Different terms, if used, are written in parentheses.

(1) The image reading device (document scanner 102 in FIG. 2, FIG. 3, and FIG. 4), according to one of the embodiments, includes an imaging device (area sensor 201) located above the document 250 and configured to capture an image of the document 250 and output an image signal (with image input unit 305), a circuitry (CPU 301*a* in the control device 301) configured to determine (with the fed-sheet size determination unit 506 in FIG. 4) a size of a fed-sheet (sheet set on the sheet-feeding tray 103*a*) based on information on the fed-sheet (sheet information generated with the sheet information generating unit 510: S106 and S107) (S108), to generate a frame image 501*a* (with the frame image generating unit 503 in FIG. 4) having a size equal to the size of the fed-sheet, in relation to the image signal output from the imaging device (area sensor 201 in FIG. 2 and FIG. 3) (S110), and to synthesize the frame image 501*a* generated (with the frame image generating unit 503) with the image signal output from the imaging device (area sensor 201) to generate a synthesized image (with the image synthesizing unit 502 in FIG. 4) (S112), and a display device (display 501 in FIG. 2 and FIG. 3) to display the synthesized image synthesized by the circuitry (using the image synthesizing unit 502) (S113).

With this configuration, the display device (display 501) displays display data in which the frame image 501*a* is added to image data (FIG. 10, FIG. 12, ect.), indicating to a user a read area of the document (frame image 501*a*) in relation to a print sheet, and calls user's attention to that the image is not within a read range in reading the image. When the user resets the document in a correct position at which the image to be read is within the read area in reading the image, in response to the above-mentioned indication of the display data, the image reading device (document scanner 102 in FIG. 2, FIG. 3, and FIG. 4) can read the image in the correct position.

(2) In the image reading device (document scanner) 102 of (1), the circuitry (CPU 301*a* in the control device 301) determines (with the fed-sheet orientation determination unit 508 in FIG. 4) an orientation of the fed-sheet (sheet set on the sheet-feeding tray 103*a*) based on the information on the fed-sheet (S108), in which the circuitry (CPU 301*a* in the control device 301) changes display information on the frame image 501*a* (with the frame image generating unit 503), according to the orientation of the fed-sheet detected (with the fed-sheet orientation determination unit 508) (for example, changing the color from red to blue). Accordingly, a printed state of the document in relation to the fed-sheet can be seen with the display 501.

(3) In the image reading device (document scanner) 102, the circuitry (CPU 301*a* in the control device 301) detects a set position of the document (with the document detection unit 701 in FIG. 11), in which the circuitry (CPU 301*a* in the control device 301) changes the display information on the frame image 501*a* (with the frame image generating unit 503 in FIG. 11) in response to detection of the document being within the frame image (by document detection unit 701) (FIG. 6, FIGS. 12E, 12F, and 12G). The user, thus, can check whether the set position of the document is within the frame image 501*a* by seeing the screen of the display 501.

(4) In the image reading device (document scanner) 102 of (3), the circuitry (CPU 301*a* in the control device 301) adds instruction information (warning 550 in FIG. 13), which instructs to reset the document in a correct position, to the display information on the frame image 501*a* (with frame image generating unit 503) in response to detection of the document not being within the frame image 501*a* (by document detection unit 701 in FIG. 11). The user, thus, can notice that the document is not to be set within the read range by seeing the screen of the display 501. This allows the user to act, according to a state of the document not being within the read range, to start printing the read document or to reset the position of the document.

(5) In the image reading device (document scanner) 102 of (3) or (4), the number of detection operations (with the document detection unit 701 in FIG. 11) are fewer than the number of input operations (input operations to input the image data to the image input unit 305) of the imaging device (area sensor 201). The less number of detection operation allows the image reading device (document scanner) 102 to enhance responsiveness in reading the image.

(6) The imaging device (area sensor 201) of the image reading device (document scanner) 102 captures the image using a moving image capturing function with low resolution. That is, in the embodiment, the area sensor 201 operates with the moving image capturing function having the low resolution (S102 and S103) to obtain the image data used for generating display data in which the image area to be printed is added, and then the display device (display 501) displays the display data on the screen to indicate to the user the read area of the document in relation to the print sheet. At this time, the area sensor 201 operates with the moving imaging function having the low resolution, so that little load is given to the circuitry and a displaying process can be performed with high speed.

(7) The image forming apparatus 100 according to the embodiment includes the image reading device (document scanner) 102 of (1) to (6), so that the image forming apparatus 100 can provides advantages of the image reading device (document scanner) 102 as described (1) to (6). For example, when copying the document, the image forming apparatus 100 can detect a set position and display a relationship between a fed-sheet and a document on a screen of the display 501 to indicate to the user the relationship.

(8) The image forming apparatus 100 of (7) includes a circuitry that configured to select a size of a print sheet for the document (with the sheet selecting unit 509 in FIG. 4), detect a size and an orientation of the fed-sheet set on the sheet-feeding device 103 (or sheet-feeding tray 103*a*) (with the fed-sheet sensing unit 511 in FIG. 4 and FIG. 11), generate information on the fed-sheet (fed-sheet information) based on the size of the print sheet for the document selected (with the sheet selecting unit 509) and the size and the orientation of the fed-sheet detected (with the fed-sheet sensing unit 511), and output the information on the fed-sheet to the image reading device (document scanner) 102. Thus the image forming apparatus 100 can inputs the fed-sheet information including at least one of size information and orientation information on the fed-sheet to the image reading device (document scanner) 102, so that the circuitry of the image reading device (document scanner) 102 can determine a size of the fed-sheet (with fed-sheet size determination unit 506 in FIG. 4 and FIG. 11) or determine an orientation of the fed-sheet (with fed-sheet orientation determination unit 508 in FIG. 4 and FIG. 11).

(9) The method of displaying an image of a document, according to one of the embodiments, includes capturing an image of the document 250 with an imaging device (area sensor 201) located above the document and outputting an image signal (S101 to S103), determining a size of a fed-sheet, for the document 250 (S108) based on fed-sheet information input (from the sheet information generating unit 510: S106 and S107), generating the frame image 501*a* having a size equal to the size of the fed-sheet input (with the frame image generating unit 503 in FIG. 4), in relation to the image signal output from the imaging device (area scanner 201) (S110), synthesizing the frame image 501*a* generated (with the frame image generating unit 503) with the image signal output from the imaging device (area scanner 201) to generate a synthesized image (using the image synthesizing unit 502 in FIG. 4), and displaying the synthesized image synthesized (with the image synthesizing unit 502) on the display device (display 501 in FIG. 2 and FIG. 4. The method, accordingly, provides the advantages as described in (1).

(10) The non-transitory recording medium storing a plurality of instructions which, when executed by a computer (CPU 301*a* of the control device 301), cause the computer (CPU 301*a* of the control device 301) to perform a method, including capturing an image of the document 250 with an imaging device (area sensor 201) located above the document 250 and outputting an image signal (S101 to S103), determining a size of a fed-sheet, for the document 250 (S108) based on fed-sheet information input (from the sheet information generating unit 510: S106 and S107), generating the frame image 501*a* having a size equal to the size of the fed-sheet, in relation to the image signal output from the imaging device (area sensor 201) (using the frame image generating unit 503 in FIG. 4) (S110), synthesizing the frame image 501*a* generated (using the frame image generating unit 503) with the image signal output from the imaging device (area sensor 201) to generate a synthesized image (using the image synthesizing unit 502) (S112), and displaying the synthesized image synthesized (using the image synthesizing unit 502 in FIG. 4) on the display device (display 501) (S113). The non-transitory recording medium storing the plurality of instructions can provide the advantages as described in (1) by downloading the plurality of instructions to the computer and causing the computer to execute the plurality of instructions.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image reading device comprising:
an imaging device configured to capture an image of a document placed below the imaging device to generate a document image and output an image signal based on the document image, the imaging device configured to capture the image of the document in one of a plurality of scanner modes, the plurality of scanner modes including a normal scanner mode and a document scanner mode, the imaging device using a moving image capturing function having a low resolution in the document scanner mode, the low resolution being low compared to a normal resolution in the normal scanner mode;
circuitry configured to
receive a selection of the document scanner mode according to a user instruction,
cause the imaging device to capture the image of the document using the moving image capturing function having the low resolution and output the image signal based on the image of the document in response to the selection of the document scanner mode,
determine a size of a fed-sheet based on information on the fed-sheet, the fed-sheet being a sheet to be formed with the document image,
generate a frame image for the document image, the frame image having a size equal to the size of the fed-sheet, and
synthesize the frame image with the image signal output from the imaging device to generate a synthesized image; and
a display configured to display the synthesized image.

2. The image reading device of claim 1 wherein, the circuitry is further configured to
determine an orientation of the fed-sheet based on the information on the fed-sheet, and
change display information on the frame image according to the orientation of the fed-sheet.

3. The image reading device of claim 1 wherein the circuitry is further configured to:
detect a set position of the document image with respect to the frame image, and
when the document image is set within the frame image, change display information on the frame image to indicate that the document is set within the fed-sheet.

4. The image reading device of claim 3 wherein, when the document image is not set within the frame image, the circuitry adds instruction information to the display information on the frame image, the instruction information instructing to reset the document in a correct position.

5. The image reading device of claim 3 wherein a number of detection operations of detecting the set position of the document, performed by the circuitry, is less than a number of input operations of capturing the image of the document, performed by the imaging device.

6. An image forming apparatus comprising:
the image reading device of claim 1; and
an image forming device to form an image on the fed-sheet based on the document image.

7. The image forming apparatus of claim 6, further comprising circuitry configured to:
receive a user selection of a size of a print sheet to be used for printing the document;
detect a size and an orientation of the fed-sheet set on a sheet-feeding tray;
generate the information on the fed-sheet based on the size of the print sheet for the document and the size and the orientation of the fed-sheet; and
output the information on the fed-sheet to the image reading device.

8. A method of displaying a document image, the method comprising:
receive a selection of a document scanner mode according to a user instruction, the document scanner mode being one of a plurality of scanner modes including a normal scanner mode and the document scanner mode, an imaging device using a moving image capturing function having a low resolution in the document scanner mode, the low resolution being low compared to a normal resolution in the normal scanner mode;
capturing, with the imaging device, an image of a document placed below the imaging device using the moving image capturing function having the low resolution to generate a document image and output an image signal based on the document image, in response to the selection of the document scanner mode;
determine a size of a fed-sheet based on information on the fed-sheet, the fed-sheet being a sheet to be formed with the document image;
generating a frame image for the document image, the frame image having a size equal to the size of the fed-sheet;
synthesizing the frame image with the image signal output from the imaging device to generate a synthesized image; and
displaying the synthesized image on a display.

9. A non-transitory recording medium storing a plurality of instructions which, when executed by one or more processors to perform a method of displaying a document image, the method comprising:
receive a selection of a document scanner mode according to a user instruction, the document scanner mode being one of a plurality of scanner modes including a normal scanner mode and the document scanner mode, an imaging device using a moving image capturing function having a low resolution in the document scanner mode, the low resolution being low compared to a normal resolution in the normal scanner mode;
capturing, with the imaging device, an image of a document placed below the imaging device using the moving image capturing function having the low resolution to generate a document image and output an image signal based on the document image, in response to the selection of the document scanner mode;

determine a size of a fed-sheet based on information on the fed-sheet, the fed-sheet being a sheet to be formed with the document image;

generating a frame image for the document image, the frame image having a size equal to the size of the fed-sheet;

synthesizing the frame image with the image signal output from the imaging device to generate a synthesized image; and displaying the synthesized image on a display.

* * * * *